(12) United States Patent
Inagaki

(10) Patent No.: US 7,567,861 B2
(45) Date of Patent: Jul. 28, 2009

(54) IN-VEHICLE DISPLAY APPARATUS

(75) Inventor: Yoshikazu Inagaki, Novi, MI (US)

(73) Assignee: DENSO CORPORATION, Kariya (JP)

( * ) Notice: Subject to any disclaimer, the term of this patent is extended or adjusted under 35 U.S.C. 154(b) by 505 days.

(21) Appl. No.: 11/434,078

(22) Filed: May 16, 2006

(65) Prior Publication Data

US 2006/0256094 A1    Nov. 16, 2006

(30) Foreign Application Priority Data

May 16, 2005    (JP)    ............................ 2005-142235

(51) Int. Cl.
*G01C 21/00*    (2006.01)
(52) U.S. Cl. ............................................ 701/1; 345/30
(58) Field of Classification Search .................. 701/1,
701/23, 24, 116, 117, 200, 213, 215; 340/988,
340/990, 904, 905; 345/5, 30, 204
See application file for complete search history.

(56) References Cited

U.S. PATENT DOCUMENTS

| | | | | |
|---|---|---|---|---|
| 5,404,443 A | * | 4/1995 | Hirata | ........................ 725/75 |
| 5,757,359 A | * | 5/1998 | Morimoto et al. | ........... 345/156 |
| 6,415,224 B1 | * | 7/2002 | Wako et al. | ................. 701/208 |
| 6,574,531 B2 | * | 6/2003 | Tan et al. | ....................... 701/1 |
| 2004/0130573 A1 | | 7/2004 | Konuma et al. | |

FOREIGN PATENT DOCUMENTS

JP    A-2004-125572    4/2004

* cited by examiner

*Primary Examiner*—Dalena Tran
(74) *Attorney, Agent, or Firm*—Posz Law Group, PLC

(57)    ABSTRACT

A car navigation system includes a liquid crystal display having a touch screen on its screen, a sound output device, and a control device. The control device determines whether a vehicle is traveling or stopping and switches display modes regarding an input window on the screen between a usual display mode and a restricted display mode. In the restricted display mode, only a certain selection item of several selection items included in a list is visibly displayed along with a cursor and selectable. A responsive area used to order movement of the cursor is defined to expand a displayed area of the cursor movement key, while a responsive area used to select the certain selection item is defined to expand a displayed area of the certain selection item to an entire area for displaying the list.

18 Claims, 3 Drawing Sheets

IN-VEHICLE DISPLAY APPARATUS

CROSS REFERENCE TO RELATED APPLICATIONS

This application is based on and incorporates herein by reference Japanese Patent Application No. 2005-142235 filed on May 16, 2005.

FIELD OF THE INVENTION

The present invention relates to an in-vehicle display apparatus having a touch screen for a user to manipulate various inputs or settings.

BACKGROUND OF THE INVENTION

For instance, a car navigation system includes a display apparatus of a liquid crystal display disposed in a central portion of an instrument panel close to a driver seat. This display apparatus displays a map surrounding a current position of a subject vehicle or an input window for input or setting, on its screen. This screen includes a touch screen (also called touch panel or touch switch), which allows a user to performs an input, setting, or instruction by touching the touch screen.

This display apparatus with the touch screen is a superior interface which is easy for a user to see and operate, and therefore adapted to various apparatuses. Furthermore, it is proposed that a user is allowed to change a character size in a manipulation button (icon) on the touch screen for enhancing visibility and operability (see Patent Document 1).

While a user (driver) is driving a vehicle, it is not preferable that the user sees the screen or performs complicated touch manipulation on the touch screen. It is because those user's actions during the driving may disperse concentration on the driving. Therefore, a measure to enhance safety during the driving has been proposed which disables switches on the screen, erases characters, or prohibits user's manipulation.

However, if almost all manipulations are prohibited during the driving, even a manipulation that hardly disturbs the safety during the driving is also precluded. Furthermore, even a manipulation from a driver-assistant seat is also caused to become ineffective. This deteriorates user-friendliness in the apparatus. It is preferable that a user is allowed to perform a minimum manipulation on the touch screen while securing the safety during the driving.

Patent Document 1: JP-2004-180275A (US-2004/0130573A1)

SUMMARY OF THE INVENTION

An object of the present invention is to provide an in-vehicle display apparatus allowing a given manipulation to an input window while securing safety during vehicle's traveling.

As an aspect of the present invention, an in-vehicle display apparatus inside a vehicle is provided as follows: a screen is included to display an input window; a touch screen is included to be provided on the screen, wherein a user is allowed to input to the input window by touching the touch screen; a determining means is included to determine whether the vehicle is traveling or stopping; and a display controlling means is included to switch both (i) a usual display mode when the vehicle is determined to be stopping and (ii) a restricted display mode when the vehicle is determined to be traveling. Here, a number of characters visibly displayed on the screen is restricted when the input window is displayed in the restricted display mode.

In the restricted display mode, restricting the number of displayed characters allows a user or driver to decrease a time to see the screen of the display apparatus. The user or a passenger seated on an assistant-driver seat is therefore secured to perform a necessary manipulation to the touch screen while safety in the driving is secured.

As another aspect of the present invention, an in-vehicle display apparatus inside a vehicle is provided as follows: a screen is included to display an input window; a touch screen is included to be provided on the screen, wherein a user is allowed to input to the input window by touching the touch screen; a determining means is included to determine whether the vehicle is traveling or stopping; and a display controlling means is included to switch both (i) a usual display mode when the vehicle is determined to be stopping and (ii) a restricted display mode when the vehicle is determined to be traveling. Here, in the usual display mode, a plurality of selection items selectable by touching the touch screen are visibly displayed on the screen. In the restricted display mode, only a single certain selection item of the plurality of selection items is visibly displayed on the screen along with a cursor and selectable; further, a responsive area used to select the certain selection item on the touch screen is defined to expand an area where the certain selection item is visibly displayed.

In the restricted display mode, displaying visibly only a single selection item from among several selection items allows safety in the driving to be secured. The single selection item is only selectable, which helps prevent the user from mis-manipulating. Furthermore, a responsive area used to select the selection item displayed in the restricted display mode is defined to be larger than that in the usual display mode. Therefore, the user can easily perform selection manipulation on the touch screen.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

A display apparatus in a car navigation system will be explained as an example embodiment according to the present invention.

Figure 1:
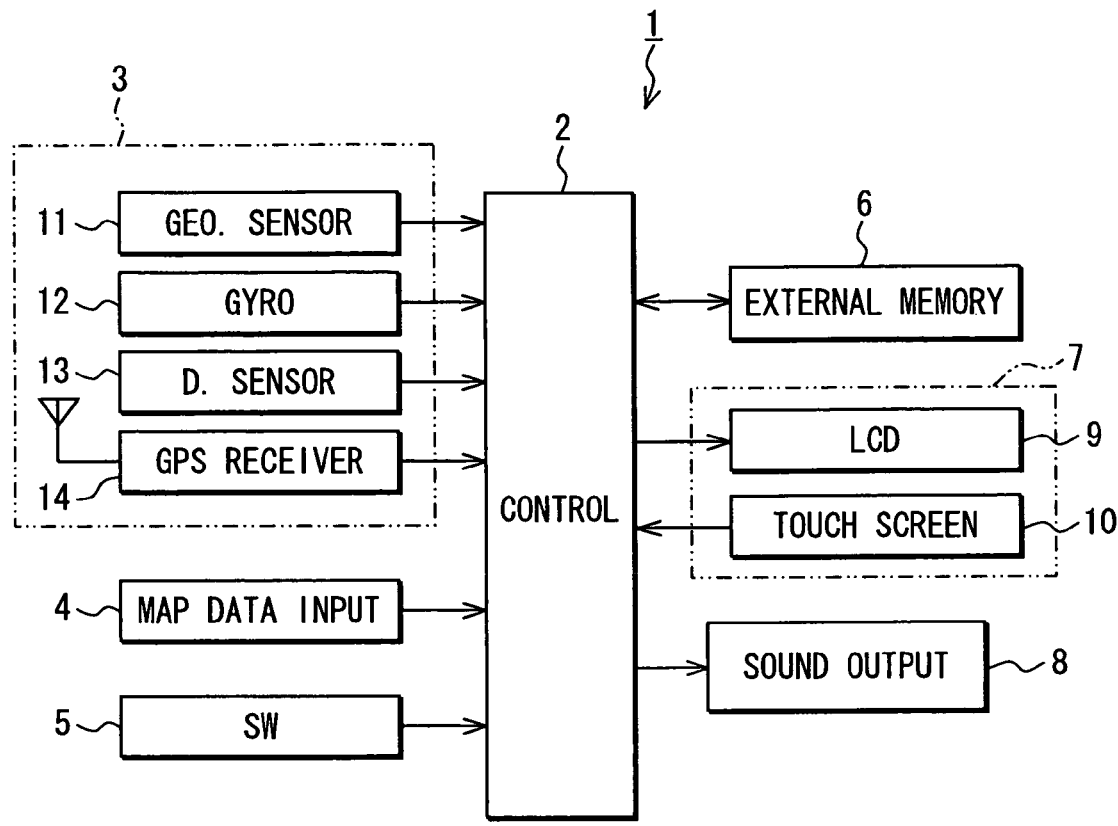
FIG. 1 is a diagram illustrating an overall structure of a car navigation system as an example embodiment according to the present invention.

As shown in FIG. 1, a navigation system 1 in a vehicle includes the following: a control device 2 of a microcomputer having a CPU, ROM, RAM, and I/O (input and output); a position detector 3 for detecting a position of the vehicle; a map data input device 4; a manipulation switch group 5; an external memory device 6; a display apparatus 7: and a sound output device 8.

The display apparatus 7 includes a color liquid crystal display (color LCD) 9 and a touch screen (also called touch switch or touch panel) 10 formed on a screen of the display 9.

The position detector 3 includes a geomagnetic sensor 11 for detecting an absolute orientation; a gyroscope 12 for detecting a rotational angle speed of the vehicle; a distance sensor 13 for detecting a travel distance of the vehicle; and a GPS (Global Positioning System) receiver 14 for receiving radio waves from GPS satellites. The distance sensor 13 includes a speed sensor for detecting a speed of the vehicle. The control device 2 determines whether the vehicle is traveling or stopping based on signals from the speed sensor; namely, the control device 2 along with the distance sensor 13 functions as a determining means for determining whether the vehicle is traveling or stopping.

The map data input device 4 includes a drive device used to input data from a storage medium storing various data such as road map data and its subordinate destination data (facility database). The storage medium is a large volume storage medium such as a CD-ROM, DVD, or hard disk. The road map data include a road shape, road width, road name, building, facility, location name, and land form. The road map further include data for reproducing a road map on a screen of the liquid crystal display 9.

The destination data include information on facilities, stores, residences, condominiums, and location names. The facilities include a transport facility such as a station; a leisure facility; accommodation; and public facility. The stores include a retail store, department store, and restaurant. The destination data further include, with respect to the foregoing information, addresses, phone numbers, and longitudes and latitudes. The destination data yet further include data for superimposing a landmark of a facility or the like over a map displayed on the screen of the liquid crystal display 9. In this case, to achieve a surrounding facility retrieval function, the destination data are classified into several genres including a gas station, convenient store, restaurant, super market, and bank (Automatic Teller Machine corner).

The manipulation switch group 5 is mechanical switches around the liquid crystal display 9. The external memory device 6 can be a flash memory card to store a software program for complying another standard, or specific data such as route data to a destination designated by the control device 2 when navigating.

The sound output device 8 outputs synthesized sounds based on instruction from the control device 2 via a speaker. For instance, in navigation, the sound output device 8 performs sound guidance to a user, using synthesized sounds such as "turn left at an intersection 200 meter ahead," "turn right shortly," or "go straight for a while."

The display apparatus 7 includes the touch screen 10 on a surface of the screen of the liquid crystal display (LCD) 9. The display apparatus 7 is disposed near a driver seat (e.g., in a central portion of an instrument panel). As is generally known, the touch screen 10 has a resistance film where transmission electrodes are arranged lengthwise and breadthwise. A position detecting circuit (not shown) detects a position on the screen where a pressing force is applied; then, detection signals are inputted to the control device 2.

The screen of the liquid crystal display 9 generally displays a map surrounding a current position of the vehicle in various map scales, and superimposes a heading direction of the vehicle and a mark for indicating the current position of the vehicle, over the displayed map. In navigating to a destination, the screen displays a window (or screen window) for navigating the vehicle along a route. The screen further displays various input windows and/or various messages. The input window is used as an interface for a user to input. Inputting includes performing various manipulations (such as designating, selecting, setting, or switching).

Figure 2:
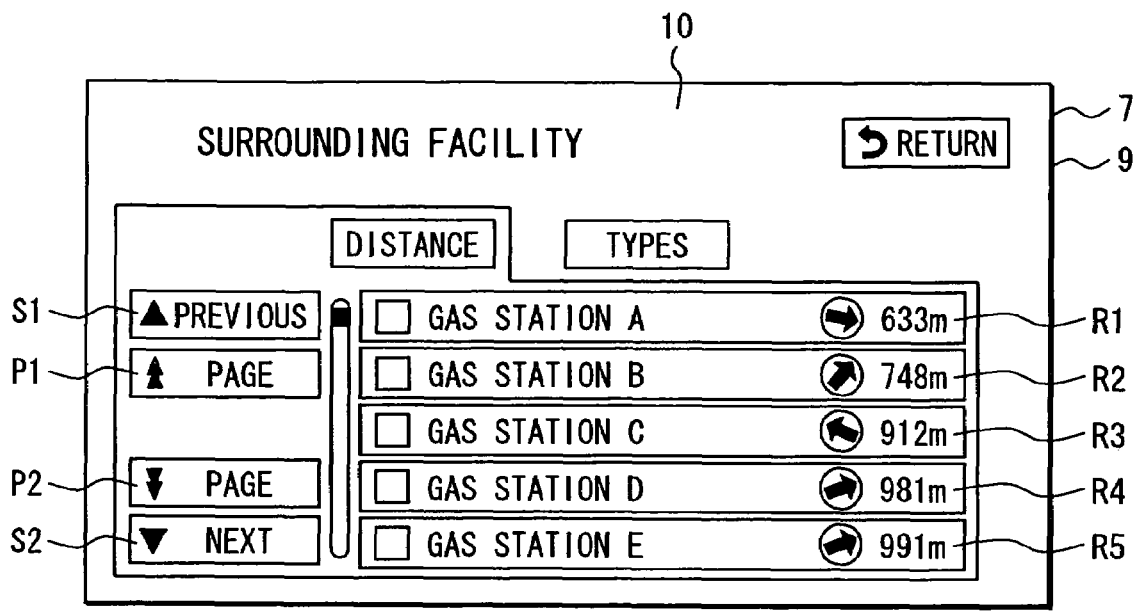
FIG. 2 is an example of an input window in a usual display mode.
Figure 3:
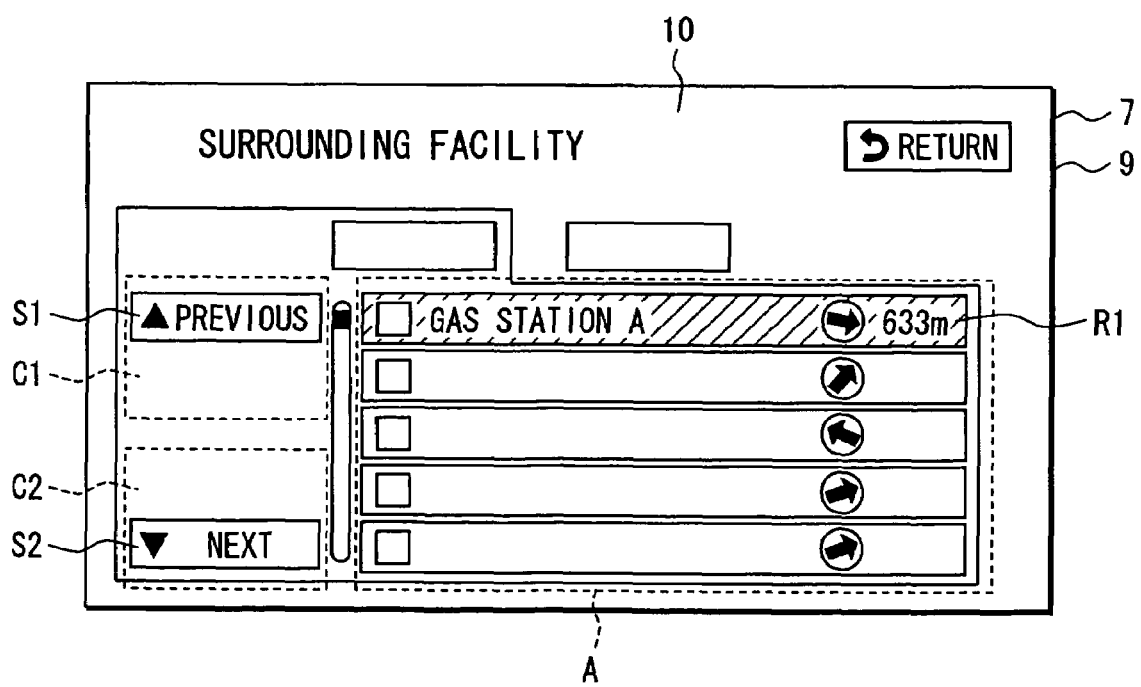
FIG. 3 is an example of an input window in a restricted display mode.

In the surrounding facility retrieval, the screen displays various input windows for a user to designate a genre, select a condition for facility retrieval, or select a facility from a list including retrieved facilities (see FIGS. 2 and 3).

An input window shows a list of selection items, and icons (manipulation keys). A user directly touches or presses the position of each selection item or icon (key) on the touch screen 10 with a finger of the user. Thus the user can perform various inputs, e.g., destination designation (facility retrieval) or road map scale change.

The control device 2 achieves a location function to detect a position of the vehicle and a navigation function to retrieve a route to a designated destination and navigate the vehicle along the route, by executing a software program. The control device 2 further achieves a surrounding facility retrieval function to retrieve a facility included in a designated genre around the position of the vehicle and inform the user of the retrieved facility.

The location function causes the liquid crystal display 9 to display a road map surrounding the current position on the screen based on road map data from the map data input device 4, and to superimpose on the map a pointer indicating the current position and heading direction of the vehicle. As the vehicle travels, the current position pointer moves on the map and the map is scrolled according to the current position. At this time, a map matching operates to match the current position to a position on a road. In addition, an instruction input by a user causes a map scale displayed on the screen to change.

The navigation function automatically navigates a user along a recommend route by calculating the recommended route from a starting position (current position) to a designated destination with the known Dijkstra method. This navigation function causes the liquid crystal display 9 to display a recommend route in a distinctive color along with a current position mark while superimposing it on a displayed map. At the same time, the navigation function causes the sound output device 8 to output guidance sounds at appropriate time.

The facility retrieval function causes the liquid crystal display 9 to display an input window for designating a genre based on an instruction for the surrounding facility retrieval (closest spot retrieval). The user designates a genre to retrieve via the input window. Based on the genre designated, a facility (or facilities) of a corresponding genre present within an area around the current position is extracted or retrieved from the facility data. The facilities retrieved are displayed in a list (alphabetically or in an ascending order of a distance), or displayed on the road map by using landmarks. The user is allowed to designate a relative facility as a destination by manipulating a selection instruction on an input window showing the list.

In this example embodiment, the control device 2 controls display of input windows on the liquid crystal display 9 based on whether the vehicle is traveling or stopping. During the stopping, a usual display mode operates a usual display not to restrict any key function or the like. In contrast, during the traveling, a restricted display mode operates a restricted display to restrict the number of display characters on the screen to, e.g., thirty-one characters maximum.

For example, the restricted display mode displays, along with a cursor, a single certain selection item of several selection items; thereby, only the certain selection item displayed along with the cursor can be selected. This restricted display mode displays a cursor movement key (also serving as a scroll key). On the touch screen 10, a large area including the displayed cursor movement key is defined to function as a responsive area used to order movement of the cursor (i.e., for movement instruction); a large area including the selection item displayed along with the cursor is defined to function as a responsive area used to select the selection item (i.e., for selection instruction). These will be explained later with reference to figures.

Furthermore, in the restricted display mode, the control device 2 causes the sound output device 8 to read the selection item displayed along with the cursor using synthesized sounds (recorded sounds) when a given period (e.g., three seconds) passes since the selection item is displayed. In the restricted display mode, a scroll function is disabled in a corresponding displayed window. Furthermore, the vehicle may start to travel when an input window is displayed in the usual display mode. In this case, the restricted display mode starts while maintaining a display configuration displayed on the screen when (or just before) the vehicle starts to travel.

Next, an operation of the above structure will be explained with reference to FIGS. 2 to 5, with an example in executing surrounding facility retrieval using the surrounding facility retrieval function.

A user may intend to stop around a certain facility (e.g., gas station, convenience store, or restaurant). The user manipulates (or touches) the touch screen 10 on the display apparatus 7 (or manipulation switch group 5) to order surrounding facility retrieval and designate an intended genre (e.g., gas station). The control device 2 executes the surrounding facility retrieval to cause the liquid crystal display 9 to display on the screen an input window shown in FIG. 2. This input window shows retrieved facilities (selection items) as a list in an ascending order of a distance. The user designates an intended facility from the list by touching the touch screen 10. The control device 2 then navigates along a route to the designated facility as a destination.

Figure 4:
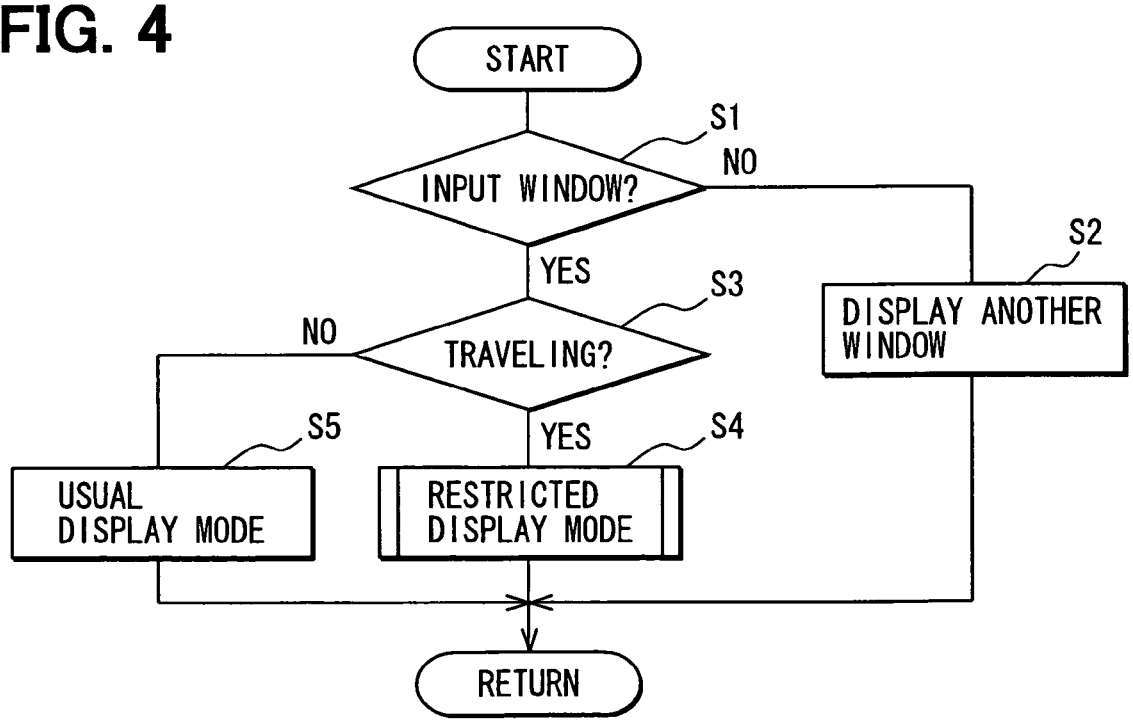
FIG. 4 is a flowchart illustrating a process for determining a display mode.

In the above, the control device 2 determines a display mode based on a flowchart in FIG. 4. At Step S1, whether a window to be displayed is an input window or not is determined. When it is not an input window (S1: NO), another window different from an input window is displayed (Step S2). When it is an input window (S1: YES), whether the vehicle is traveling or stopping is determined at Step S3.

When the vehicle is traveling (Step S3: YES), the input window is displayed in the restricted display mode at Step S4. Otherwise, the input window is displayed in the usual display mode at Step S5.

A display example of an input window in the usual display mode is shown in FIG. 2. A list of gas stations is shown on the screen of the liquid crystal display 9. This display example in the usual display mode includes five names of gas stations as selection items R1 to R5, while further including scroll keys S1 and S2 and page scroll keys (forward and backward) P1 and P2 near the left side of the window. Furthermore, a "RETURN" key for returning to a previous window is constantly displayed in a top right portion of the window.

The user touches a certain item of the selection items R1 to R5 on the touch screen 10 to select it as an intended gas station as a destination. In this window, touching the scroll key S1, S2 or page scroll key P1, P2 causes the list to scroll each item or each page, respectively. At this time instant, the vehicle is stopping, so that the user can see the input window or touch the screen while securing safety.

Figure 5:
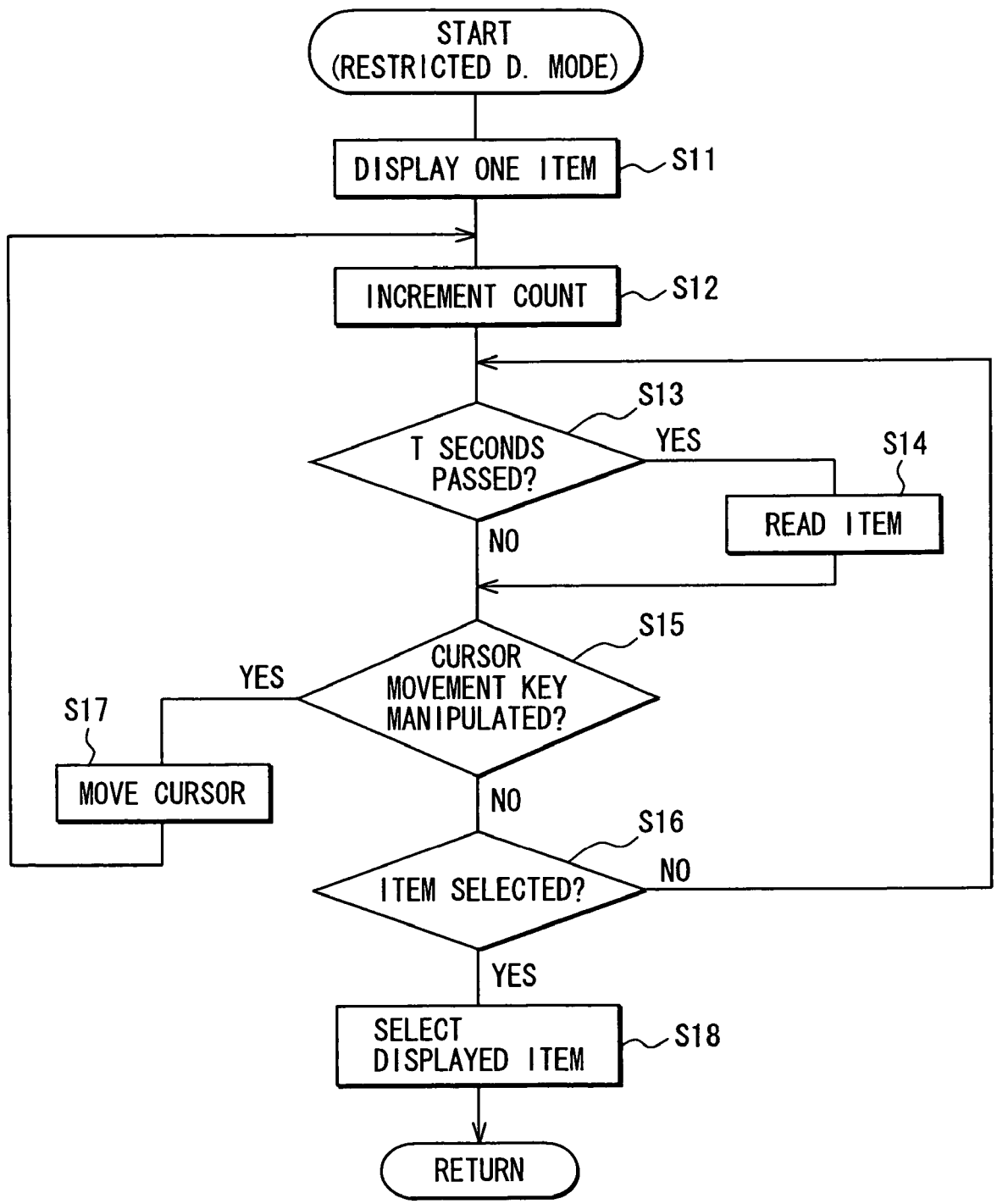
FIG. 5 is a flowchart illustrating a control process in a restricted display mode.

In contrast, in the restricted display mode, display control operates as shown in FIG. 5. A display example in FIG. 3 in the restricted display mode is also used for retrieving a gas station with the surrounding facility retrieval, similarly to the example in FIG. 2.

At Step S11, in the restricted display mode, the example displays only one name of a gas station R1 of the selection items R1 to R5, while further including scroll keys S1 and S2 and page scroll keys (forward and backward) P1 and P2 near the left side of the window. Cursor movement keys S1 and S2 are also shown near the left side of the window at the same time. At Step S12, a timer starts to increment a count.

In the display example in FIG. 3, a first selection item R1 of the list of "gas station" is only visibly displayed (in "cursor display"), while other R2 to R5 are invisible in their characters. In the "cursor display," the background of one selection item caused to become brighter than other items, and the item (or characters of the item) is caused to become conspicuous. In FIG. 3, a portion in the cursor display is shown in hatched lines.

With respect to the other selection items, their characters may be erased, or colors in their characters or backgrounds may be changed to become less visible. In short, it is required that a user is able to see no more than the given number of characters or unable to see more than the given number of characters while driving the vehicle. Furthermore, the number of characters within the window is no more than 31 characters, while marks, direction displays, and ruled lines (boarders) other than the characters remain visible on the screen. Although the page scroll keys P1 and P2 are invisible, the scroll keys S1, S2 are still visible to function as cursor movement keys upward and downward.

At Step S13, whether the count of the timer reaches a given time t (e.g., an appropriate time from three to six seconds) is determined. When the count reaches the given time t without user's manipulation (S13: YES), the sound output device 8 reads the item (e.g., selection item R1) currently in the cursor display at Step S14. The user (driver and/or passenger) can therefore understand the item currently in the cursor display without needing to see the screen on the liquid crystal display 9.

The user is allowed to order movement of the cursor or select the selection item in the cursor display by touching the touch screen 10 after or before the selection item is read. At Step S15, whether the cursor movement key (i.e., scroll key S1, S2) is manipulated is determined. At Step S16, whether the selection item is selected is determined.

In this example in the restricted display mode shown in FIG. 3, responsive areas for movement instruction are defined to be expanded areas C1, C2 (surrounded by dotted lines) including the scroll keys S1, S2, respectively. Furthermore, a responsive area for selection instruction is defined to be a vertically expanded area A (surrounded by dotted lines) including the selection item R1. In addition, in the restricted display mode, the scrolling (including page scrolling) of the selection items (list) is not allowed to operate.

When the cursor movement key is manipulated, i.e., either of the responsive areas C1 and C2 is touched (S15: YES), the cursor display is moved. Therefore, when the user intends to select a selection item other than the selection item R1 currently displayed (in the cursor display), the user touches the responsive area C1 once to move the cursor display to the one-row lower selection item. When the highest selection item R1 is in the cursor display, movement upward is not allowed. When the lowest selection item R5 is in the cursor display, movement downward is not allowed, similarly. As the cursor display is moved at Step S17, Step S12 is repeated for the timer to start again to increment a count.

When the user touches the responsive area A (S16: YES), the selection item (intended gas station) in the cursor display at this instant is selected as a destination at Step S18.

The above structure allows a user to input or select (perform destination designation) even in the restricted display mode while the vehicle is traveling. Limiting the number of displayed characters (or displayed selection items or keys (icons)) allows a user to see the displayed items for a shorter period. Furthermore, defining the responsive areas to be expanded (larger) allows a user to roughly touch the touch screen 10. These decrease time for the user to see the screen, thereby securing safety during the traveling or driving.

In addition, the window displayed on the screen continues when the usual display mode changes to the restricted display mode, i.e., when the vehicle starts to travel. Similarly, the window displayed on the screen continues when the restricted display mode changes to the usual display mode, i.e., when the vehicle stops traveling. This structure helps prevent user's feeling of strangeness due to the display mode change.

As explained above, according to the example embodiment, the number of characters displayed on the screen of the liquid crystal display 9 is limited in the restricted display mode during the vehicle's traveling. This allows a user to see items displayed on the screen for a short time, thereby helping prevent the user from not focusing on the driving. As a result, even during the driving, a user is allowed to perform a necessary manipulation (minimum requirement) to an input window while securing safety in the driving.

This structure in the restricted display mode does not prohibit a user from performing all manipulations on the touch screen 10 during the driving. User-friendliness can be therefore enhanced. In addition, a passenger on an assistant-driver seat can also perform a manipulation on the screen. Furthermore, a user is allowed to roughly touch the responsive areas defined larger on the touch screen 10 than that in the usual display mode. This eliminates a meticulous manipulation and enhances the safety in the driving.

Furthermore, the sound output device 8 is designed to read a selection item selectable (in the cursor display), which allows a user to secondarily see the screen on the liquid crystal display 9. This also enhances the safety in the driving. This reading of the sound output device 8 takes place after a given time (t seconds) passes since the selection item is displayed. This can prevent the reading from starting while a user is manipulating the cursor movement, or from repeating when the vehicle repeats stopping in congested traffic. This decreases user's feeling of bothersomeness.

In the above example embodiment, the present invention is adapted to a display apparatus in a car navigation system; however, it can be adapted to a display apparatus in an in-vehicle apparatus such as a driving assistance system.

Each or any combination of processes or steps explained in the above can be achieved as a software unit (e.g., subroutine) and/or a hardware unit (e.g., circuit or integrated circuit), including or not including a function of a related device; furthermore, the hardware unit can be constructed inside of a microcomputer.

It will be obvious to those skilled in the art that various changes may be made in the above-described embodiments of the present invention. However, the scope of the present invention should be determined by the following claims.

What is claimed is:

1. An in-vehicle display apparatus for a vehicle, the apparatus comprising:

a screen displaying an input window;

a touch screen provided on the screen, wherein a user is allowed to input to the input window by touching the touch screen;

determining means for determining whether the vehicle is traveling or stopping; and display controlling means for switching between both (i) a usual display mode when the vehicle is determined to be stopping and (ii) a restricted display mode when the vehicle is determined to be traveling, wherein in the restricted display mode, a number of characters displayed on the screen is restricted when the input window is displayed, wherein in the usual display mode, a plurality of selection items selectable by touching the touch screen are displayed on the screen, wherein in the restricted display mode, (i) only a single certain selection item from among the plurality of selection items is displayed along with a cursor on the screen, only the single certain selection item with the cursor being selectable, (ii) a cursor movement key to order movement of the cursor is displayed, and (iii) a responsive area on the touch screen used to order the movement of the cursor is defined as an expanded area containing not only an area where the cursor movement key is displayed, but also an area which is outside of the area where the cursor movement key is displayed.

2. The in-vehicle display apparatus of claim 1, wherein in the usual display mode, a scroll key is displayed to scroll the plurality of selection items, and in the restricted display mode, the scroll key functions as a cursor movement key to order movement of the cursor.

3. The in-vehicle display apparatus of claim 1, wherein in the restricted display mode, a responsive area used to select the certain selection item on the touch screen is defined to expand an area where the certain selection item is displayed.

4. The in-vehicle display apparatus of claim 1, further comprising:

a sound output device for reading the certain selection item after a given period passes from when the certain selection item is displayed along with the cursor in the restricted display mode.

5. The in-vehicle display apparatus of claim 1, wherein a scroll function on the screen is disabled in the restricted display mode.

6. The in-vehicle display apparatus of claim 1, wherein when the determining means determines that the vehicle is traveling while the input window is displayed in the usual display mode, the display control means switches from the usual display mode to the restricted display mode while maintaining a display configuration, which is displayed in the usual display mode when the vehicle is determined to be traveling.

7. The in-vehicle display apparatus of claim 1, wherein in the restricted display mode, the number of characters displayed is not more than thirty one.

8. An in-vehicle display apparatus for a vehicle, the apparatus comprising:

a screen displaying an input window;

a touch screen provided on the screen, wherein a user is allowed to input to the input window by touching the touch screen;

determining means for determining whether the vehicle is traveling or stopping; and display controlling means for switching both (i) a usual display mode when the vehicle is determined to be stopping and (ii) a restricted display mode when the vehicle is determined to be traveling, wherein in the usual display mode, a plurality of selection items selectable by touching the touch screen are individually visibly defined on the screen, wherein in the restricted display mode, only a single certain selection item from among the plurality of selection items is visibly defined along with a cursor on the screen, only the single certain selection item with the cursor being selectable, and wherein in the restricted display mode, a responsive area used to select the certain selection item on the touch screen is defined as an expanded area where the certain selection item is visibly defined along with the cursor and an area outside of the area where the certain selection item is visibly defined along with the cursor.

9. An in-vehicle display apparatus for a vehicle, the apparatus comprising:
a screen displaying an input window;
a touch screen provided on the screen, wherein a user is allowed to input to the input window by touching the touch screen; and
a control device that includes
a determining unit that determines whether the vehicle is traveling or stopping and
a display control unit that switches both (i) a usual display mode when the vehicle is determined to be stopping and (ii) a restricted display mode when the vehicle is determined to be traveling,
wherein a number of characters displayed on the screen is restricted when the input window is displayed in the restricted display model.
wherein in the usual display mode, a plurality of selection items selectable by touching the touch screen are displayed on the screen,
wherein in the restricted display mode,
(i) only a single certain selection item from among the plurality of selection items is displayed along with a cursor on the screen, only the single certain selection item with the cursor being selectable, and
(ii) a cursor movement key to order movement of the cursor is displayed, and
(iii) in the restricted display mode, a second responsive area on the touch screen used to order the movement of the cursor is defined as an expanded area containing not only a first responsive area in the usual display mode but also an area which is outside of the first responsive area, and
wherein in the usual display mode, the first responsive area on the touch screen used to order the movement of the cursor is defined based on an area where the cursor movement key is displayed.

10. An in-vehicle display apparatus for a vehicle, the apparatus comprising:
a screen displaying an input window;
a touch screen provided on the screen, wherein a user is allowed to input to the input window by touching the touch screen;
determining means for determining whether the vehicle is traveling or stopping; and
display controlling means for switching both (i) a usual display mode when the vehicle is determined to be stopping and (ii) a restricted display mode when the vehicle is determined to be traveling,
wherein a number of characters displayed on the screen is restricted when the input window is displayed in the restricted display mode,
wherein in the usual display mode, a plurality of selection items selectable by touching the touch screen are displayed on the screen, and
wherein in the restricted display mode,
(i) only a single certain selection item from among the plurality of selection item with a cursor is displayed along with a cursor on the screen, only the single certain selection item with the cursor being selectable,
(ii) a first responsive area used to select the certain selection item on the touch screen is defined as an expanded an area containing not only an area where the certain selection item is displayed along with the cursor but also an area which is outside of the area where the certain selection item is displayed along with the cursor.

11. The in-vehicle display apparatus of claim 10,
wherein in the restricted display mode,
(iii) a cursor movement key is displayed to order movement of the cursor, and
(iv) a responsive area on the touch screen that is used to order the movement of the cursor is defined as an expanded area containing not only an area where the cursor movement key is displayed, but also an area which is outside of the area where the cursor movement key is displayed.

12. The in-vehicle display apparatus of claim 10, wherein
in the usual display mode, a scroll key is displayed to scroll the plurality of selection items, and
in the restricted display mode, the scroll key functions as a cursor movement key to order movement of the cursor.

13. The in-vehicle display apparatus of claim 10, further comprising:
a sound output device for reading the certain selection item after a given period passes from when the certain selection item is displayed along with the cursor in the restricted display mode.

14. The in-vehicle display apparatus of claim 10, wherein a scroll function on the screen is disabled in the restricted display mode.

15. The in-vehicle display apparatus of claim 10, wherein when the determining means determines that the vehicle is traveling while the input window is displayed in the usual display mode,
the display control means switches from the usual display mode to the restricted display mode while maintaining a display configuration, which is displayed in the usual display mode when the vehicle is determined to be traveling.

16. The in-vehicle display apparatus of claim 10, wherein in the restricted display mode, the number of characters displayed is not more than thirty one.

17. An in-vehicle display apparatus for a vehicle, the apparatus comprising:
a screen displaying an input window;
a touch screen provided on the screen, wherein a user is allowed to input to the input window by touching the touch screen; and
a control device that includes
a determining unit that determines whether the vehicle is traveling or stopping, and
a display control unit that switches both (i) a usual display mode when the vehicle is determined to be stopping and (ii) a restricted display mode when the vehicle is determined to be traveling, wherein a number of characters visibly displayed on the screen is restricted when the input window is displayed in the restricted display mode, wherein in the usual display mode, a plurality of selection items selectable by touching the touch screen are individually displayed on the screen, wherein in the restricted display mode, only a single certain selection item from among the plurality of selection items is displayed along with a cursor on the screen, with only the single certain selection item and the cursor being selectable, and wherein in the usual display mode, a first responsive area used to select the certain selection item on the touch screen is defined based on an area where the certain selection item is displayed, wherein in the restricted display mode, a second responsive area used to select the certain selection item along with the cursor on the touch screen is defined as a first expanded area containing not only the first responsive area in the usual display mode but also an area which is outside of the first responsive area.

18. The in-vehicle display apparatus of claim 17, wherein in the usual display mode, a third responsive area used to order the movement of the cursor is defined based on an area where the cursor movement key is displayed, and wherein in the restricted display mode, a fourth responsive area on the touch screen used to order the movement of the cursor is defined as a second expanded area containing not only the third responsive area in the usual display mode but also an area which is outside of the third responsive area.

* * * * *